(12) United States Patent
Cui (10) Patent No.: US 12,091,604 B2
(45) Date of Patent: Sep. 17, 2024

(54) LIQUID CRYSTAL ALIGNMENT MATERIAL AND DISPLAY PANEL (71) Applicant: TCL CHINA STAR OPTOELECTRONICS TECHNOLOGY CO., LTD., Shenzhen (CN)

(72) Inventor: Wei Cui, Shenzhen (CN)

( * ) Notice: Subject to any disclaimer, the term of this patent is extended or adjusted under 35 U.S.C. 154(b) by 146 days.

(21) Appl. No.: 16/621,699

(22) PCT Filed: Nov. 18, 2019

(86) PCT No.: PCT/CN2019/119246
§ 371 (c)(1),
(2) Date: Dec. 12, 2019

(87) PCT Pub. No.: WO2021/017319
PCT Pub. Date: Feb. 4, 2021

(65) Prior Publication Data
US 2021/0332298 A1    Oct. 28, 2021

(30) Foreign Application Priority Data

Jul. 26, 2019 (CN) .......................... 201910684928.9

(51) Int. Cl.
*G02F 1/1333* (2006.01)
*C09K 19/54* (2006.01)
*C09K 19/56* (2006.01)

(52) U.S. Cl.
CPC ............ *C09K 19/56* (2013.01); *C09K 19/544* (2013.01); *C09K 2019/548* (2013.01)

(58) Field of Classification Search
CPC ............... C09K 19/52; C09K 19/56544; C09K 2019/548
See application file for complete search history.

(56) References Cited

U.S. PATENT DOCUMENTS 9,815,764 B2 * 11/2017 Stoddart ................. C07C 65/24
2004/0087666 A1    5/2004 Atwood

FOREIGN PATENT DOCUMENTS

| CN | 101230273 A | 7/2008 |
|---|---|---|
| CN | 103403113 A | 11/2013 |
| CN | 105566129 A | 5/2016 |
| CN | 107213466 A | 9/2017 |
| CN | 108440339 A | 8/2018 |
| CN | 109030478 A | 12/2018 |
| JP | 2007101673 A | 4/2007 |
| JP | 2007103432 A | 4/2007 |

OTHER PUBLICATIONS

Nierengarten et al., "Piling up pillar(5)arenes to self-assemble nanotubes", 2016, Chemistry, A European Journal, vol. 22, pp. 6185-6189. (Year: 2016).*
Yang et al., "Construction of a pillar[5]arene-based linear supramolecular polymer and a photo-responsive supramolecular network", 2014, Polym. Chem, vol. 5, pp. 6645-6650. (Year: 2014).*

* cited by examiner

*Primary Examiner* — Geraldina Visconti (57) ABSTRACT

A liquid crystal alignment material and a display panel containing the same are provided. The liquid crystal alignment material includes an additive and pillar[n]arene. The additive includes a first group, a second group, and a third group. The second group is attached between the first group and the third group. The third group has a polarity. The pillar[n]arene includes n benzene rings and n is a positive integer. The benzene rings are bonded to each other and define a cavity. The pillar[n]arene is attached to the first group of the additive. The display panel includes the liquid crystal alignment material and a liquid crystal molecule.

2 Claims, 3 Drawing Sheets

LIQUID CRYSTAL ALIGNMENT MATERIAL AND DISPLAY PANEL

FIELD OF INVENTION

The present application relates to a field of display technologies, and more particularly to a liquid crystal alignment material and a display panel including the same.

BACKGROUND OF INVENTION

Liquid crystal displays (LCDs) possess characteristics of high resolution and low power consumption, which are the most widely used flat panel display technologies and are widely used in television, notebook computers, smartphones, etc. Until now, liquid crystal displays have a twisted nematic (TN) mode, an in-plane switching (IPS) mode, a fringe field switching (FFS) mode, a multi-domain vertical alignment (MVA) mode, and a polymer stabilization vertical alignment (PSVA) mode. Among the alignment modes, the VA mode has a small phase delay in a "standing" state that is perpendicular to the substrate in the dark state, so that the VA mode has a higher contrast. Among the VA mode, the PSVA mode is widely used because of its fast response time, low energy consumption, and wide viewing angles. In order to realize the vertical alignment mode, a polyimide (PI) layer is first coated on surfaces of the upper substrate and the lower substrate in the manufacturing process of the panel. The polyimide layer has a side chain perpendicular to the substrate. The side chain causes the liquid crystal molecules adjacent to the polyimide to exhibit a vertical standing state, thereby achieving intermolecular interaction forces. Therefore, the polyimide layer must first be prepared and then the liquid crystal is added dropwise during the manufacturing process of the polymer stabilized vertical alignment display panel. However, in the manufacturing process of the polyimide layer, a large amount of solvent is required and are subjected to high temperature conditions and cleaning processes during a post-bake process, which greatly increases process complexity and energy consumption. Therefore, a polyimide-free alignment layer technology has been developed. Principle of this technology is that a self-assemble additive is added to a surface of substrates of liquid crystals, thereby replacing polyimide and achieving alignment.

In the polyimide-free alignment layer technology, the additive of the liquid crystals not only performs functions of aligning liquid crystal molecules, but also affects photoelectric performance of liquid crystal panels and reliability of the liquid crystal panels. In previous studies, the present inventors found that the polyimide-free alignment layer technology has a problem of poor alignment because the alignment groups of end terminals of the additive are mostly composed of an alkyl chain. Molecular interaction between the alkyl chain and the liquid crystal molecules is weak. Therefore, the polyimide-free alignment layer technology has a poor alignment ability to align liquid crystal molecules.

Therefore, it is necessary to provide a liquid crystal alignment material and a display panel including the same to solve the problems of the prior art.

Technical Problems

In view of the above, the present disclosure provides a liquid crystal alignment material and a display panel including the same, so as to solve the problem that the polyimide-free alignment layer technology existing in the prior art has poor alignment.

SUMMARY OF INVENTION

The main object of the present disclosure is to provide a liquid crystal alignment material capable of increasing molecular interactions between a liquid crystal alignment material and liquid crystal molecules such that the liquid crystal alignment material is stably bonded to the liquid crystal molecules and orientations of the liquid crystal molecules can be effectively switched. The liquid crystal alignment material also increases photoelectric performance and reliability of liquid crystal panels, and reduces thickness of the liquid crystal panels to increase response speeds. In addition, the liquid crystal alignment material may also form a host-guest driven self-assembly with the liquid crystal molecules, thereby increasing alignment ability to align liquid crystal molecules.

A secondary object of the present disclosure is to provide a display panel including the liquid crystal alignment material, which can omit the process of forming an alignment film, reduce manufacturing cost and time of liquid crystal panels, and avoid uneven display (Mura) phenomenon due to poor alignment of liquid crystal molecules. Uniformity of liquid crystal panels are increased.

In order to achieve the foregoing object of the present disclosure, an embodiment of the present disclosure provides a liquid crystal alignment material, comprising:

an additive comprising a first group, a second group, and a third group, wherein the first group of the additive is a substituted or unsubstituted $C_{1-8}$ alkyl group, the second group is attached between the first group and the third group, and the third group has a polarity; and pillar[n]arene comprising n benzene rings, wherein n is a positive integer, the benzene rings are bonded to each other and define a cavity, and the pillar[n]arene is attached to the first group of the additive.

In an embodiment of the present application, the second group of the additive is selected from the group consisting of phenyl, naphthyl, anthryl, phenanthryl, furyl, indolyl, pyridyl, pyrimidyl, pyrrolyl, quinolyl, and thienyl.

In an embodiment of the present application, the additive is represented by Formula I:

Formula I wherein:
the first group is R, and the R is a substituted or unsubstituted alkyl group;
the second group is X, and the X is phenylene or cyclohexylene; and
the third group is P, and the P is a polar functional group.

In an embodiment of the present application, the pillar[n]arene is represented by Formula II:

Formula II wherein:
R₁ and R₃ are alkyl;
R₂ and R₄ are respectively hydrogen or alkyl;
A and B are alkoxy; and
m is a positive integer, m=n−1, and m is selected from 3 to 9.

In an embodiment of the present application, the alkoxy group of B of the pillar[n]arene to the liquid crystal alignment material is substituted by the first group of the additive.

In an embodiment of the present application, n of pillar[n]arene is 8 to 10, and the pillar[n]arene defines two cavities.

Furthermore, an embodiment of the present disclosure provides a display panel, comprising:
a liquid crystal alignment material comprising:
an additive comprising a first group, a second group, and a third group, the second group is attached between the first group and the third group, and the third group has a polarity;
pillar[n]arene comprising n benzene rings, wherein n is a positive integer, the benzene rings are bonded to each other and define a cavity, and the pillar[n]arene is attached to the first group of the additive; and
a liquid crystal molecule intercalated in the cavity of the pillar[n]arene by an intermolecular force.

In an embodiment of the present application, the additive is represented by Formula I:

Formula I wherein:
the first group is R, and the R is a substituted or unsubstituted alkyl group;
the second group is X, and the X is phenylene or cyclohexylene; and
the third group is P, and the P is a polar functional group.

In an embodiment of the present application, the liquid crystal molecule comprises a benzene ring and an alkyl chain, and the benzene ring and/or the alkyl chain of the liquid crystal molecule are assembled within the cavity of the pillar[n]arene via a π-π interaction.

Furthermore, an embodiment of the present disclosure provides a liquid crystal alignment material, comprising:
an additive comprising a first group, a second group, and a third group, wherein the second group is attached between the first group and the third group, and the third group has a polarity; and
pillar[n]arene comprising n benzene rings, wherein n is a positive integer, the benzene rings are bonded to each other and define a cavity, and the pillar[n]arene is attached to the first group of the additive.

In an embodiment of the present application, the first group of the additive is a substituted or unsubstituted $C_{1-8}$ alkyl group.

In an embodiment of the present application, the second group of the additive is selected from the group consisting of phenyl, naphthyl, anthryl, phenanthryl, furyl, indolyl, pyridyl, pyrimidyl, pyrrolyl, quinolyl, and thienyl.

In an embodiment of the present application, the additive is represented by Formula I:

Formula I wherein:
the first group is R, and the R is a substituted or unsubstituted alkyl group;
the second group is X, and the X is phenylene or cyclohexylene; and
the third group is P, and the P is a polar functional group.

In an embodiment of the present application, the pillar[n]arene is represented by Formula II:

Formula II wherein:
R₁ and R₃ are alkyl;
R₂ and R₄ are respectively hydrogen or alkyl;
A and B are alkoxy; and
m is a positive integer, m=n−1, and m is selected from 3 to 9.

In an embodiment of the present application, the alkoxy group of B of the pillar[n]arene to the liquid crystal alignment material is substituted by the first group of the additive.

In an embodiment of the present application, the n of pillar[n]arene is 8 to 10, and the pillar[n]arene defines two cavities.

Beneficial Effects

Compared with the prior art, a liquid crystal alignment material of the present disclosure is capable of increasing molecular interactions between a liquid crystal alignment material and liquid crystal molecules such that the liquid crystal alignment material is stably bonded to the liquid crystal molecules and orientations of the liquid crystal molecules can be effectively switched. The liquid crystal alignment material also increases photoelectric performance and reliability of liquid crystal panels, and reduces thickness of the liquid crystal panels to increase response speeds. In addition, the liquid crystal alignment material can also form a host-guest driven self-assembly with the liquid crystal molecules, thereby increasing alignment ability to align liquid crystal molecules.

The display panel of the present disclosure comprising a liquid crystal alignment material can omit the process of forming an alignment film, reduce manufacturing cost and time of liquid crystal panels, and avoid uneven display (Mura) phenomenon due to poor alignment of liquid crystal molecules. Uniformity of liquid crystal panels are increased.

For a better understanding of the aforementioned content of the present invention, preferable embodiments are illustrated in accordance with the attached figures for detailed explanation.

DETAILED DESCRIPTION OF PREFERRED EMBODIMENTS

In the following detailed description, reference is made to the accompanying figures, in which various examples are shown by way of illustration. In this regard, directional terminology mentioned in the present disclosure, such as "top", "bottom", "front", "back", "left", "right", "inner", "outer", "lateral", "side", "surrounding", "center", "horizontal", "transverse", "vertical", "longitudinal", "axial", "radial", "uppermost" or "lowermost", etc., is used with reference to the orientation of the figures being described. Therefore, the directional terminology is used for purposes of illustration and is not intended to limit the present invention. In the accompanying figures, units with similar structures are indicated by the same reference numbers.

The terms "comprise", "includes", and their conjugates mean "including but not limited to".

The terms "a", "an" and "at least one of" as used herein include plural references unless the context clearly dictates otherwise. For example, the term "a processing module" or "at least one processing module" may include a plurality of processing modules, including combination thereof.

Figure 1:
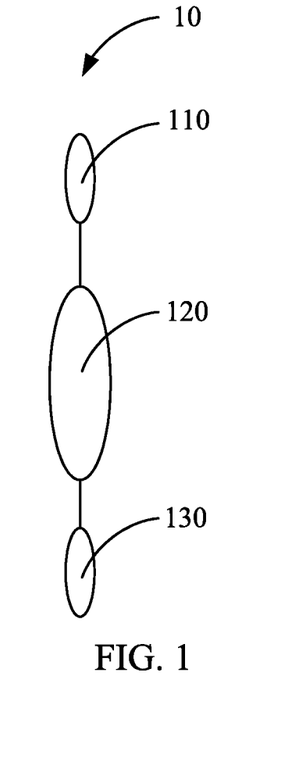
FIG. 1 is a schematic view of a structure of an additive to an embodiment of the present disclosure.
Figure 2:
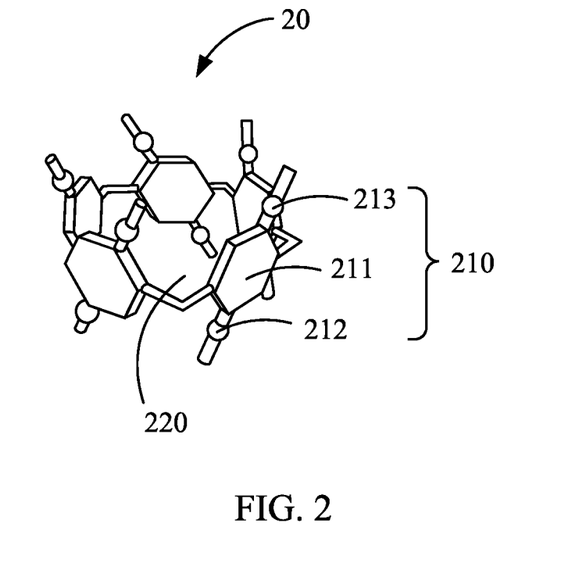
FIG. 2 is a schematic perspective view of a pillar[5]arene of an embodiment of the present disclosure.
Figure 3:
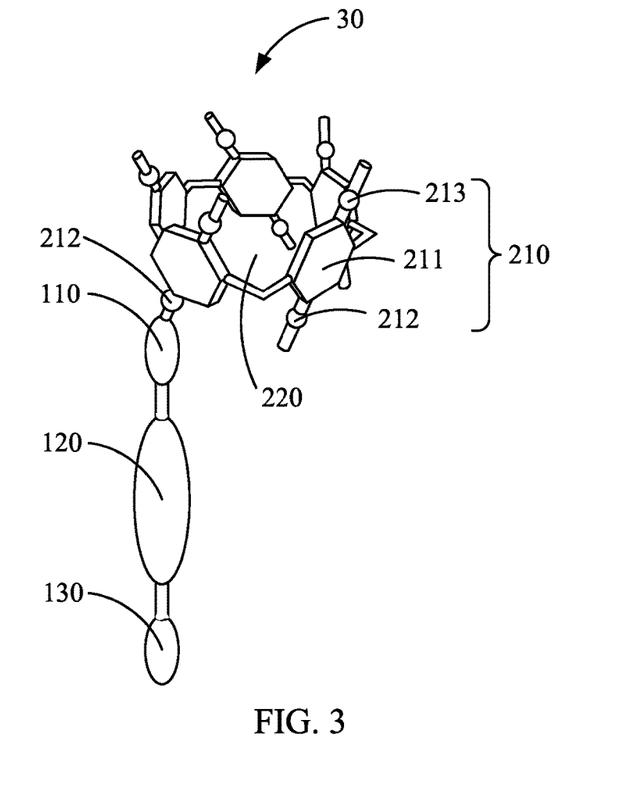
FIG. 3 is a schematic view of a liquid crystal alignment material of an embodiment of the present disclosure.

Please refer to FIGS. 1-3. FIG. 1 is a schematic view of a structure of an additive to an embodiment of the present disclosure. FIG. 2 is a schematic perspective view of a pillar[5]arene of an embodiment of the present disclosure. FIG. 3 is a schematic view of a liquid crystal alignment material of an embodiment of the present disclosure.

An embodiment of the present disclosure provides a liquid crystal alignment material 30, comprising: an additive 10 and a pillar[n]arene 20.

The additive 10 includes a first group 110, a second group 120, and a third group 130. The second group 120 is attached between the first group 110 and the third group 130. The third group 130 has a polarity. The first group 110 of the additive 10 can be a substituted or unsubstituted $C_{1-8}$ alkyl group, for example, a substituted or unsubstituted methyl group, a substituted or unsubstituted ethyl group, a substituted or unsubstituted butyl group, a substituted or unsubstituted pentyl group, a substituted or unsubstituted hexyl group, and a substituted or unsubstituted fluorenyl group. The second group 120 of the additive 10 can be selected from the group consisting of phenyl, naphthyl, anthryl, phenanthryl, furyl, indolyl, pyridyl, pyrimidyl, pyrrolyl, quinolyl, and thienyl. The third group 130 can be a polar functional group, such as halogen, epoxy, hydroxy, amino, nitrilo, mercapto, imino, carboxy, sulfonic groups, and other polar functional groups including the same.

In an embodiment of the present disclosure, the additive 10 is represented by the Formula I:

Formula I

The first group 110 is R, and the R is a substituted or unsubstituted alkyl group. The second group 120 is X, and the X is benzene or cyclopentane. The third group 130 is P, and the P is a polar functional group. Examples of the polar functional group are as described above.

The pillar[n]arene 20 is composed of n monomers 210 in which n is a positive integer. Each monomer 210 has a benzene ring 211. The benzene ring 211 may also have a functional group 212, 213 attached thereto. Therefore, the pillar[n]arene 20 has n benzene rings 211. The benzene rings are bonded to each other and define a cavity 220. The pillar[n]arene 20 is attached to the first group 110 of the additive 10. In an embodiment of the present disclosure, as shown in FIG. 3, the functional group 212 of the pillar[n]arene 20 is attached to the first group 110 of the additive 10.

In an embodiment of the present disclosure, the pillar[n]arene 20 is represented by the Formula II:

Formula II $R_1$ and $R_3$ are alkyl groups. $R_2$ and $R_4$ are respectively hydrogen or alkyl. A and B are alkoxy groups. m is a positive integer, m=n−1, and m is selected from 3 to 9. The alkoxy group of B of the pillar[n]arene 20 of the liquid crystal alignment material 30 can be substituted by the first group 110 of the additive 10.

If n of the pillar[n]arene 20 is 3 to 7, the pillar[n]arene 20 defines a cavity 220. A size of the cavity 220 increases as the n increases. For example, when the n of the pillar[n]arene 20 is 3, the pillar[n]arene 20 defines a triangular cavity 220. When the n of the pillar[n]arene 20 is 5, the pillar[n]arene 20 defines a five-membered ring and forms a pentagonal cavity 220. When the n of the pillar[n]arene 20 is 7, the pillar[n]arene 20 defines a seven-membered ring and forms a heptagonal cavity 220.

If n in the pillar[n]arene 20 is 8 to 10, the pillar[n]arene 20 defines two cavities 220. The cavities 220 are formed by benzene rings of the pillar[n]arene 20. When the n of the pillar[n]arene 20 is 8, the pillar[n]arene 20 defines two five-membered rings. When the n of the pillar[n]arene 20 is 9, the pillar[n]arene 20 defines a five-membered ring and a six-membered ring. When the n of the pillar[n]arene 20 is 10, the pillar[n]arene 20 defines two six-membered rings.

A manufacturing method of a liquid crystal alignment material 30 of an embodiment of the present disclosure is described hereinafter. For example, in the pillar[n]arene (Formula III), the $R_1$, $R_2$, $R_3$ and $R_4$ are each a methyl group, both A and B are methoxy, n is 5, and m is 4. For example, in the additive (Formula V), the first group 110 is a bromopropyl group, X of the second group 120 is benzene or cyclopentane, and L is selected from hydrogen, fluorine, chlorine, bromine, and iodine, and the third group 130 is a hydroxypropyl group. An embodiment of the present disclosure is exemplified by the above characteristics. Other pillar[n]arene 20 and additives 10 described in the present disclosure can also be prepared by same or similar methods as those described below, and details are not described herein.

Demethylation of the Pillar[n]Arene:

In an embodiment of the present disclosure, the pillar[5]arene (Formula III) is subjected to a demethylation reaction by a demethylation reagent (for example, a solution of $BBr_3$ in $CH_2Cl_2$) to form a demethylated pillar[5]arene (Formula IV).

Formula III → $BBr_3 CH_2Cl_2$ →

Formula IV

Protection of Polar Functional Groups of the Additive:

A protecting group (for example, a solution of tert-butyldimethylsilyl chloride (TBSCl) in imidazole) and $CH_2Cl_2$ are used to protect polar functional groups of the additive (Formula V) (i.e. a hydroxyl group in the present embodiment) to produce a corresponding silyl ether.

Formula V → TBSCl, imidazole / $CH_2Cl_2$ → Formula VI

X = benzene or cyclohexane
L = H, F, Cl, Br, or I

Substitution Reaction Performed on the Pillar[n]Arene with the Additive:

The treated pillar[n]arene (Formula IV) and the protected additive (Formula VI) are subjected to a substitution reaction using a catalyst (for example, a solution of potassium carbonate ($K_2CO_3$) in dimethyl sulfoxide (DMSO)) to produce a protected liquid crystal alignment material (Formula VII).

Formula IV + Formula VI → $K_2CO_3$, DMSO →

Formula VII

Deprotection of the Protected Liquid Crystal Alignment Material:

The protecting group in the protected liquid crystal alignment material (Formula VII) is removed by a deprotecting agent (for example, a solution of TBAF in THF) to produce a liquid crystal alignment material of an embodiment of the present disclosure (Formula VIII).

Formula VII

Formula VIII

Figure 4:
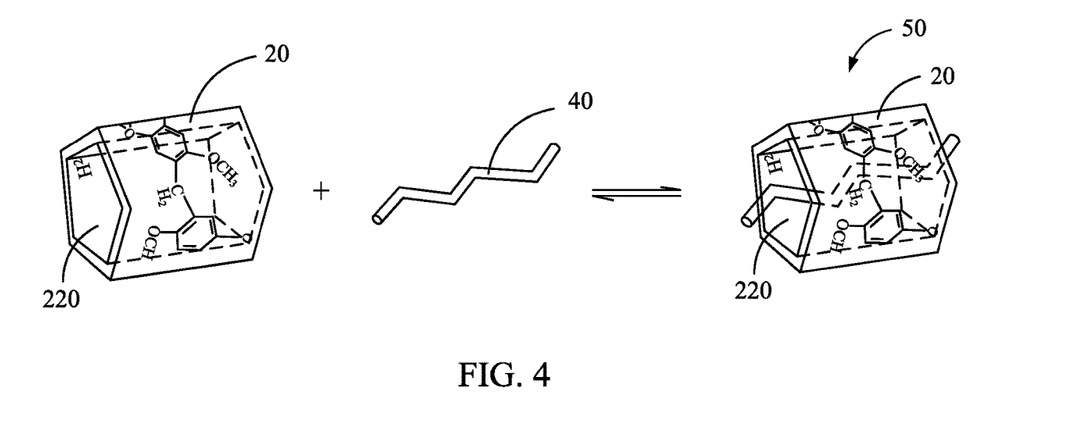
FIG. 4 is a schematic view of an assembly process of an annular pillar[n]arene molecule and liquid crystal molecules according to an embodiment of the present disclosure.
Figure 5:
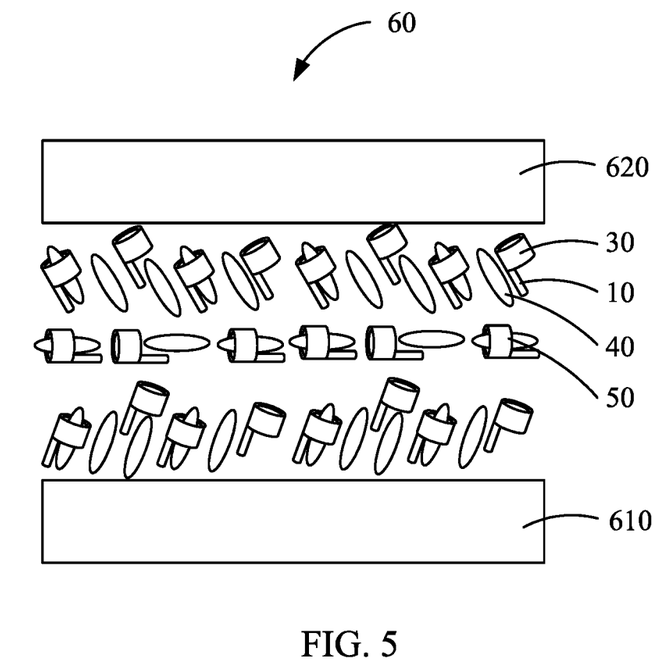
FIG. 5 is a schematic view of a display panel in accordance with an embodiment of the present disclosure.

Please refer to FIG. 4 and FIG. 5. FIG. 4 is a schematic view of an assembly process of an annular pillar[n]arene molecule and a liquid crystal molecule according to an embodiment of the present disclosure. FIG. 5 is a schematic view of a display panel in accordance with an embodiment of the present disclosure.

Another embodiment of the present disclosure provides a display panel 60 including the aforementioned liquid crystal alignment material 30. The display panel 60 includes a liquid crystal alignment material 30 and a liquid crystal molecule 40.

The additive 10 includes a first group 110, a second group 120, and a third group 130. The second group 120 is attached between the first group 110 and the third group 130. The third group 130 has a polarity, as shown in FIG. 1. The first group 110 of the additive 10 can be a substituted or unsubstituted $C_{1-8}$ alkyl group, for example, a substituted or unsubstituted methyl group, a substituted or unsubstituted ethyl group, a substituted or unsubstituted butyl group, a substituted or unsubstituted pentyl group, a substituted or unsubstituted hexyl group, and a substituted or unsubstituted fluorenyl group. The second group 120 of the additive 10 can be selected from the group consisting of phenyl, naphthyl, anthryl, phenanthryl, furyl, indolyl, pyridyl, pyrimidyl, pyrrolyl, quinolyl, and thienyl. The third group 130 can be a polar functional group, such as halogen, epoxy, hydroxy, amino, nitrilo, sulfhydryl, imino, carboxy, sulfonic groups, and other polar groups including the same.

In an embodiment of the present disclosure, the additive 10 is represented by the Formula I:

Formula I

The first group 110 is R, and the R is a substituted or unsubstituted alkyl group. The second group 120 is X, and the X is benzene or cyclopentane. The third group 130 is P, and the P is a polar functional group. Examples of the polar functional group are as described above.

The pillar[n]arene 20 is composed of n monomers 210 in which n is a positive integer. Each monomer 210 has a benzene ring 211. The benzene ring 211 may also have a functional group 212, 213 attached thereto, as shown in FIG. 2. Therefore, the pillar[n]arene 20 has n benzene rings 211. The benzene rings are bonded to each other and define a cavity 220. The pillar[n]arene 20 is attached to the first group 110 of the additive 10. In an embodiment of the present disclosure, as shown in FIG. 3, the functional group 212 of the pillar[n]arene 20 is attached to the first group 110 of the additive 10.

In an embodiment of the present disclosure, the pillar[n]arene 20 is represented by the Formula II:

Formula II $R_1$ and $R_3$ are alkyl groups. $R_2$ and $R_4$ are respectively hydrogen or alkyl. A and B are alkoxy groups. m is a positive integer, m=n−1, and m is selected from 3 to 9. The alkoxy group of B of the pillar[n]arene 20 of the liquid crystal alignment material 30 can be substituted by the first group 110 of the additive 10.

If n of the pillar[n]arene 20 is 3 to 7, the pillar[n]arene 20 defines a cavity 220. A size of the cavity 220 increases as the n increases. For example, when the n of the pillar[n]arene 20 is 3, the pillar[n]arene 20 defines a triangular cavity 220. When the n of the pillar[n]arene 20 is 5, the pillar[n]arene 20 defines a five-membered ring and forms a pentagonal cavity 220. When the n of the pillar[n]arene 20 is 7, the pillar[n]arene 20 defines a seven-membered ring and forms a heptagonal cavity 220.

If n in the pillar[n]arene 20 is 8 to 10, the pillar[n]arene 20 defines two cavities 220. The cavities 220 are formed by benzene rings of the pillar[n]arene 20. When the n of the pillar[n]arene 20 is 8, the pillar[n]arene 20 defines two five-membered rings. When the n of the pillar[n]arene 20 is 9, the pillar[n]arene 20 defines a five-membered ring and a six-membered ring. When the n of the pillar[n]arene 20 is 10, the pillar[n]arene 20 defines two six-membered rings.

The liquid crystal molecule 40 intercalated in the cavity 20 of the pillar[n]arene 20 by an intermolecular force.

The liquid crystal molecule 40 includes a benzene ring and an alkyl chain. The benzene ring and/or the alkyl chain of the liquid crystal molecule 40 are assembled within the cavity 220 of the pillar[n]arene 20 via a π-π interaction. The liquid crystal molecule 40 can also form a host-guest driven self-assembly with the liquid crystal molecule.

Furthermore, the benzene ring of the liquid crystal molecule 40 and the benzene ring of the pillar[n]arene 20 form a face-to-face stacking or an offset face-to-face stacking by an effect of a π-π bond. The alkyl chain of the liquid crystal molecule 40 can form a side-to-face stacking by an effect of a C—H-π bond.

As shown in FIG. 4 and FIG. 5, the liquid crystal molecules 40 can form an assembly 50 with the liquid crystal alignment material 30. The liquid crystal molecule 40 can also abut a side of the additive 10 of the liquid crystal alignment material 30 by intermolecular forces.

The display panel 60 can further include a first substrate 610 and a second substrate 620. The first substrate 610 may be a rigid substrate, a flexible substrate, or an array substrate. The second substrate 620 may be a rigid substrate, a flexible substrate, or a color filter substrate. The liquid crystal alignment material 30 and the liquid crystal molecules 40 are disposed between the first substrate 610 and the second substrate 620. The liquid crystal alignment material 30 and the liquid crystal molecules 40 can be disposed on the first substrate 610 by any process known to people skilled in the art (for example, by a process such as solution processes, spin coating, inkjet printing, or filling process).

The display panel 60 can further include other known elements, such as a device layer, a pixel layer, etc. The display panel 60 may be assembled or encapsulated by known processes, and details are not described herein.

The term "alkyl" used herein describes a saturated aliphatic hydrocarbon including straight chain and branched chain groups. Preferably, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. More preferably, the alkyl is a medium size alkyl having 1 to 10 carbon atoms. Most preferably, unless otherwise indicated, the alkyl is a lower alkyl having 1 to 4 carbon atoms (C(1-4) alkyl) or even 1 to 3 carbon atoms (C(1-3) alkyl). Exemplary alkyls include methyl, ethyl and propyl The term "alkoxy" used herein describes an —O-alkyl group, with the alkyl being as described herein.

The term "polar functional group" refers to a covalent bond having a high degree of polarization.

The term "cycloalkyl" used herein describes an all-carbon monocyclic or fused ring (i.e., rings which share an adjacent pair of carbon atoms) group where one or more of the rings does not have a completely conjugated π-electron system and can be further substituted or unsubstituted.

Accordingly, a liquid crystal alignment material of the present disclosure is capable of increasing molecular interactions between a liquid crystal alignment material and liquid crystal molecules such that the liquid crystal alignment material is stably bonded to the liquid crystal molecules and orientations of the liquid crystal molecules can be effectively switched. The liquid crystal alignment material also increases photoelectric performance and reliability of liquid crystal panels, and reduces thickness of the liquid crystal panels to increase response speeds. In addition, the liquid crystal alignment material can also form a host-guest driven self-assembly with the liquid crystal molecules, thereby increasing alignment ability to align liquid crystal molecules.

The display panel of the present disclosure comprising a liquid crystal alignment material can omit the process of forming an alignment film, reduce manufacturing cost and time of liquid crystal panels, and avoid uneven display (Mura) phenomenon due to poor alignment of liquid crystal molecules. Uniformity of liquid crystal panels are increased.

In summary, although the present disclosure has been described with preferred embodiments thereof, the above preferred embodiments is not used to limit the present disclosure. One of ordinarily skill in the art can carry out changes and modifications to the described embodiment without departing from the scope and the spirit of the disclosure that is intended to be limited only by the appended claims.

The invention claimed is:

1. A liquid crystal alignment material, wherein the liquid crystal alignment material is presented by Formula (1):

Formula (1)

wherein each X is phenylene or cyclohexylene.

2. A display panel, comprising:
a liquid crystal alignment material and a liquid crystal molecule;
wherein the liquid crystal alignment material is presented by Formula (1):

Formula (1)

wherein each X is phenylene or cyclohexylene;
wherein five benzene rings of in the Formula (1) are bonded to each other and define one cavity; and
wherein the liquid crystal molecule is intercalated in the cavity by an intermolecular force.

* * * * *